United States Patent
De Haan et al.

(10) Patent No.: US 6,219,436 B1
(45) Date of Patent: Apr. 17, 2001

(54) MOTION VECTOR ESTIMATION AND DETECTION OF COVERED/UNCOVERED IMAGE PARTS

(75) Inventors: Gerard De Haan; Anna Pelagotti, both of Eindhoven (NL)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/181,160

(22) Filed: Oct. 28, 1998

(30) Foreign Application Priority Data

Oct. 29, 1997 (EP) .................................................. 97202562

(51) Int. Cl.[7] ....................................................... G06K 9/00
(52) U.S. Cl. .................................. 382/107; 356/27; 73/488
(58) Field of Search ........................... 382/107; 348/416; 395/200; 345/154

(56) References Cited

U.S. PATENT DOCUMENTS

| | | | |
|---|---|---|---|
| 5,978,030 | * 11/1999 | Jung et al. | 348/416 |
| 5,995,080 | * 11/1999 | Biro et al. | 345/154 |
| 6,026,217 | * 2/2000 | Adiletta | 395/200 |

FOREIGN PATENT DOCUMENTS

| | | | |
|---|---|---|---|
| 535066 B1 | * 7/1993 | (FR) | H04N/5/14 |
| 2279531 | 1/1995 | (GB) | H04N/5/14 |
| 9120155A1 | 12/1991 | (WO) | H04N/5/14 |
| 9628931A2 | 9/1996 | (WO) | H04N/5/44 |
| 9628931A3 | 9/1996 | (WO) | H04N/5/44 |

\* cited by examiner

Primary Examiner—Matthew C. Bella
Assistant Examiner—M. Choobin
(74) Attorney, Agent, or Firm—John F. Vodopia

(57) ABSTRACT

In a method of detecting covered and uncovered parts in an image to be interpolated between neighboring previous (I) and next (III) input images, backward motion vectors from the next input image to the previous input image, and having corresponding backward estimation errors, and forward motion vectors from the previous input image to the next input image, and having corresponding forward estimation errors, are determined, uncovered and covered parts are detected in the neighboring previous and next input images, respectively, in the thus detected uncovered parts, uncovered parts in the image to be interpolated are detected by determining second backward estimation errors by comparing both neighboring previous and next input images when partially shifted over the backward motion vectors to a temporal location of said image to be interpolated, and by comparing the second backward estimation errors to a threshold, and in the thus detected covered parts, covered parts in the image to be interpolated are detected by determining second forward estimation errors by comparing both neighboring previous and next input images when partially shifted over the forward motion vectors to a temporal location of the image to be interpolated, and by comparing the second forward estimation errors to the threshold.

10 Claims, 2 Drawing Sheets

MOTION VECTOR ESTIMATION AND DETECTION OF COVERED/UNCOVERED IMAGE PARTS

BACKGROUND OF THE INVENTION

1. Field of the Invention

The invention relates to motion vector estimation and detection of covered/uncovered image parts. The invention also relates to motion-compensated interpolation, and to a display apparatus comprising means for carrying out such a motion-compensated interpolation.

2. Description of the Related Art

The paper "Motion estimation method using the spatio-temporal characteristics of moving objects", presented at the International Workshop on HDTV, Los Angeles, October, 1996, by H. Sonehara et al., discloses a motion vector detection method which takes account of the spatio-temporal continuity of motion vectors and the local characteristics of pictures. Motion vector trajectories are traced to assess the spatio-temporal continuity of motion vectors. To remove erroneous motion vectors detected in the covered/uncovered background of the contour area of moving objects, motion vectors are estimated by means of a detection-area hierarchy and the correlation of luminance signals. It is necessary to identify, in two sequential fields, the area (covered and uncovered background area) in which the picture correlation becomes indeterminate. For this, a detection block is set in the current field and vectors are detected in relation to the next field. Then a detection block is set in the next field and vectors are detected in relation to the current field. In short, motion vectors are detected two-way.

European Patent Specification EP-B-0,535,066 discloses a method of assigning the appropriate one (if any) of a plurality of possible motion vectors to pixels of a video signal consisting of a series of pictures, the method comprising the steps of: a backwards assignment operation in which a first input picture is shifted by each of a plurality of possible vectors and compared to a second, succeeding picture to determine assignment errors for each vector at each pixel; a forward assignment operation in which the second picture is shifted by each of a plurality of possible vectors and compared to the first picture to determine assignment errors for each vector at each pixel; and using, for each pixel, the assignment errors determined in both forward assignment and backwards assignment operations to determine whether any of the vectors is appropriate for that pixel. The method may further comprise comparing the assignment errors for the forward and backwards assignment operations for a pixel to determine whether the pixel may relate to revealed or obscured background. This combined vector assignment flags regions of both revealed and obscured background as 'no match' so that a fallback interpolation technique can be used. This fallback interpolation technique has not been described. In an alternative method, vectors from the instant of an input picture are converted to an output picture at a different instant in time by projecting the input vectors forward in time (allowing for their motion). Several problems are inherent in projecting vectors forward in time. While these problems are not insurmountable the technique of combined forward and backward assignment is simpler and therefore more attractive.

SUMMARY OF THE INVENTION

It is, inter alia, an object of the invention to provide a reliable motion detection/motion-compensated interpolation. To this end, a first aspect of the invention provides a motion vector estimation method and device for an image to be interpolated between neighboring previous and next input images. A second aspect of the invention provides an interpolation method using said motion vector estimation method. A third aspect of the invention provides a display apparatus using said device for estimating motion vectors. A fourth aspect of the invention provides a method of and device for detecting covered and uncovered parts in an image to be interpolated.

A primary aspect of the invention provides a method of detecting covered and uncovered parts in an image to be interpolated between neighboring previous and next input images, in which backward motion vectors from the next input image to the previous input image, and having corresponding backward estimation errors, and forward motion vectors from the previous input image to the next input image, and having corresponding forward estimation errors, are determined, uncovered and covered parts are detected in the neighboring previous and next input images, respectively, in the thus detected uncovered parts, uncovered parts in the image to be interpolated are detected by determining second backward estimation errors by comparing both neighboring previous and next input images when partially shifted over the backward motion vectors to a temporal location of said image to be interpolated, and by comparing the second backward estimation errors to a threshold, and in the thus detected covered parts, covered parts in the image to be interpolated are detected by determining second forward estimation errors by comparing both neighboring previous and next input images when partially shifted over the forward motion vectors to a temporal location of the image to be interpolated, and by comparing the second forward estimation errors to the threshold.

Another aspect of the invention provides a method of estimating motion vectors for an image to be interpolated between neighboring previous and next input images, in which motion from the next input image to the previous input image is detected to obtain backward motion vectors having corresponding backward estimation errors, motion from the previous input image to the next input image is detected to obtain forward motion vectors having corresponding forward estimation errors, uncovered and covered parts are detected in the image to be interpolated, motion vectors are furnished for the uncovered parts in dependence upon the forward motion vectors taken from locations wholly and/or partly shifted over the backward motion vector, and motion vectors for the covered parts are furnished in dependence upon the backward motion vectors taken from locations wholly and/or partly shifted over the forward motion vectors.

These and other aspects of the invention will be apparent from and elucidated with reference to the embodiments described hereinafter.

DESCRIPTION OF THE PREFERRED EMBODIMENTS

Figure 1:
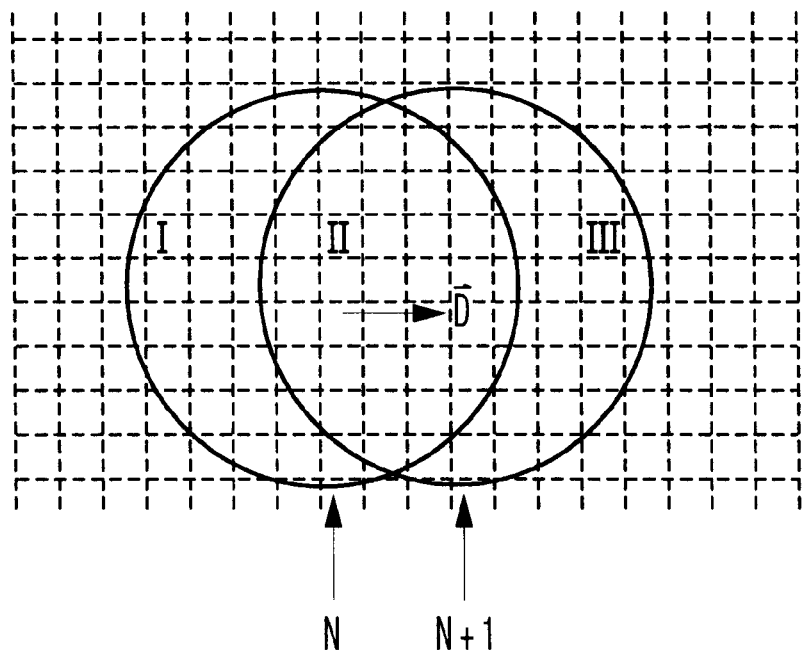
FIG. 1 illustrates covering and uncovering background situations.

A primary aspect of the present invention aims at a strong reduction, if not an elimination, of halo effects for systems that have access to both neighboring fields by analyzing in which of the two fields the information, that has to be interpolated, is present (i.e., not covered) using two motion vectors per location. This information is used to interpolate the motion compensated picture from both neighboring images ignoring pixels from either of the two images that were either covered, or uncovered. The use of two motion estimators in parallel is considered to be realistic, even in consumer products, since earlier work [Refs. 7, 8] has reduced the cost of a motion estimator to an affordable level. Nevertheless, an alternative will be discussed in which the additional calculations are only required in areas where covering or uncovering is expected, i.e., near picture parts in which discontinuities (contours) in the vector field occur.

Basic requirement for the current algorithm is the availability of two motion vectors for every location. The first vector $\vec{D}$, is the one calculated by shifting a previous field to optimally match a current field, whereas the second is obtained by shifting the data from the current field to optimally match a previous field. The required segmentation of the image in "normal, "covering", and "uncovering" regions will be dealt with later. First, we shall elucidate the motion vector calculation using the full-search block-matching motion estimator to calculate the motion vectors. This algorithm is not a very cost effective approach to the motion estimation problem, but the more effective ones are based on the same principle.

In block-matching motion estimation algorithms, a displacement vector is assigned to the center $\vec{X} = (Xx, Xy)^T$ of a block of pixels $B(\vec{X})$ in the current field n by searching a similar block within a search area $SA(\vec{X})$, also centered at $\vec{X}$, but in the previous field n−1. The similar block has a center, which is shifted with respect to $\vec{X}$ over the displacement vector $\vec{D}(\vec{X}, n)$. To find $\vec{D}(\vec{X}, n)$, a number of candidate vectors $\vec{C}$ are evaluated applying an error measure $(\vec{C}, \vec{X}, n)$ to quantify block similarity. More formally, $CS_{max}$ is defined as the set of candidates $\vec{C}$, describing all possible (usually integer) displacements with respect to $\vec{X}$ within the search area $SA(\vec{X})$ in the previous image:

$$CS^{max} = \{\vec{C} | -N \leq C_x \leq N, -M \leq C_y \leq M\} \quad (1)$$

where N and M are constants limiting $SA(\vec{X})$. Furthermore, a block $B(\vec{X})$ centered at $\vec{X}$ and of size X by Y consisting of pixel positions $\vec{x} = (x,y)^T$ in the present field n, is now considered:

$$B(\vec{X}) = \{\vec{x} | X_x - X/2 \leq x \leq X_x + X/2 \wedge X_y - Y/2 \leq y \leq X_y + Y/2\} \quad (2)$$

The displacement vector $\vec{D}(\vec{X}, n)$ resulting from the block-matching process, is a candidate vector $\vec{C}$ which yields the minimum value of an error function $(\vec{C}, \vec{X}, n)$:

$$\vec{D}(\vec{X}, n) \in \{\vec{C} \in CS^{max} | \epsilon(\vec{C}, \vec{X}, n) \leq \epsilon(\vec{V}, \vec{X}, n) \forall \vec{V} \in CS^{max}\} \quad (3)$$

If, which is the common case, the vector $\vec{D}(\vec{x}, n)$ with the smallest matching error is assigned to all pixel positions x in the block $B(\vec{X})$:

$$\forall \vec{x} \in B(\vec{X}) : \vec{D}(\vec{x}, n) = \vec{D}(\vec{X}, n) \quad (4)$$

rather than to the center pixel only, a large reduction of computations is achieved.

As an implication, consecutive blocks $B(\vec{X})$ are not overlapping. The error value for a given candidate vector $\vec{C}_b$ is a function of the luminance values of the pixels in the current block and those of the shifted block from a previous field, summed over the block $B(\vec{X})$. A common choice, which we will use, is the sum of the absolute differences:

$$\epsilon_b(\vec{C}, \vec{X}, n) = \sum_{\vec{x} \in B(\vec{X})} |F(\vec{x}, n-1) - F(\vec{x} + \vec{C}_b, n)| \quad (5)$$

although a mean square error or a normalized cross correlation function are sometimes proposed.

The difference between the first and the second motion estimator, using candidates $\vec{C}_b$ and $\vec{C}_f$ respectively and resulting in motion vectors $\vec{D}_b$ and $\vec{D}_f$, is that we propose in the method according to the invention, lies in the error criterion of Eq. (5). According to Eq. (5), the current field is shifted to optimally match the previous field (backward prediction). The second estimator that we propose is identical to the first, apart from Eq. (5) which is replaced by:

$$\epsilon_f(\vec{C}, \vec{X}, n) = \sum_{\vec{x} \in B(\vec{X})} |F(\vec{x}, n) - F(\vec{x} - \vec{C}_f, n-1)| \quad (6)$$

This implies that $\vec{D}_f$ is optimally suited for forward prediction. With two estimators defined above, a high match error of the best matching candidate means that it is:

difficult to predict the current field with the previous, for the forward predicting estimator applying Eq. (6), or that it is:

difficult to predict the previous field with the present, for the backwards predicting estimator applying Eq. (5).

The first situation occurs in case of uncovering background, the other is typical for a covering of the background. The relative performance RP of the two motion estimators is now proposed to decide upon covering and uncovering:

$$RP = \frac{(\epsilon_b - \epsilon_f)}{(\epsilon_b + \epsilon_f) + \delta} \quad (7)$$

and:

$$\text{decision} = \begin{cases} \text{covering}, & (RP \geq Th_1) \\ \text{uncovering}, & (RP \leq -Th_1) \end{cases} \quad (8)$$

where δ is introduced to prevent decisions of covering/ uncovering in case of small match errors. In the experiments, δ was set to approximately 1 percent of the maximum error.

However, preferably, the following decision is taken:

$$\text{decision} = \begin{cases} \text{uncovering}, & (\epsilon_b \leq \epsilon_f * Th_1 + Th_2) \\ \text{covering}, & (\epsilon_f \leq -\epsilon_b * 1/Th_1 + Th_2) \end{cases} \quad (7/8a)$$

where $Th_2$ is introduced to prevent decisions of covering/ uncovering in case of small match errors. In the experiments, $Th_1$ was set to approximately 3 and $Th_2$ to 20.

When a block is detected as belonging to either the covering or the uncovering region, the 8 blocks surrounding it are also assigned to that region, in order to improve the spatial consistency.

FIG. 1 illustrates the covering and uncovering background situations. A moving object, a circle, is shown moving (with motion vector $\vec{D}$) from left to right. N indicates the position in field n, while N+1 indicates the position in field n+1. Region I is uncovered in field n+1, while for region III, covering occurs. Region II can be interpolated from both fields.

Although this brings some clarity about areas where covering and uncovering appears, the precision of the method is not optimally suited for the image(s) to be interpolated. In that image, only part of region I is uncovered and only part of region III becomes covered. The fraction depends on the temporal position of the interpolated image relative to the neighboring original images. If the interpolated image has to be valid at the temporal instance exactly in between the previous and next original, then the covering and uncovering areas are half the size that we detected.

Figure 2:
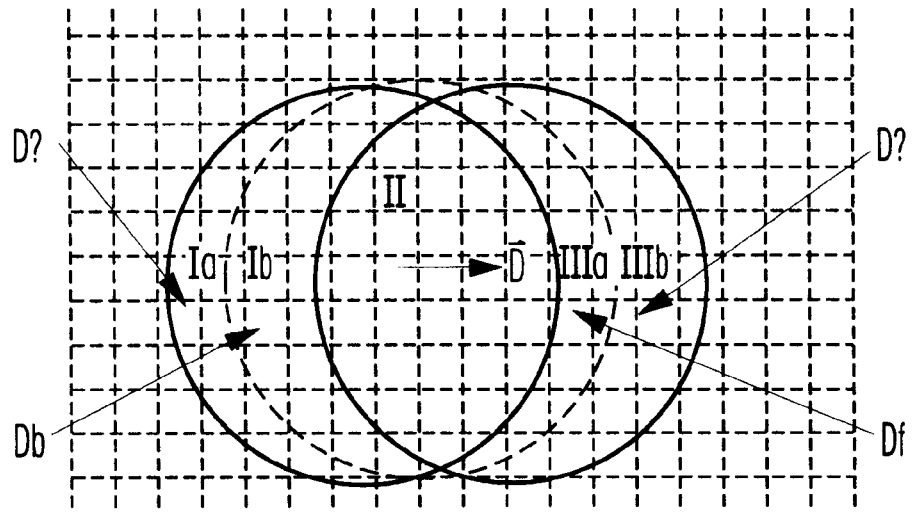
FIG. 2 illustrates where in the interpolated image covering and uncovering occurs.

FIG. 2 illustrates this case into more detail, and shows, particularly, regions in which covering and uncovering occurs, and where, in the interpolated image which motion vector can be safely used, and from which, next or previous, image, data should be used in the interpolation process. Region Ia can be interpolated from the next image using vector $\vec{D}_?$. Region Ib can be interpolated from the next and the previous image using vector $\vec{D}_b$. Region IIIa can be interpolated from the next and the previous image using vector $\vec{D}_f$. Region IIIb can be interpolated from the next image using vector $\vec{D}_?$. Two areas still exist, i.e., Ia and IIIb, for which no suitable motion vector has been identified. Hereinafter, a practical solution for all regions will be introduced.

So far, we have distinguished areas in which covering and uncovering occurs between two successive images. However, at the temporal instance where the new image is interpolated, we need to refine our earlier recognition of covering and uncovering based on $\epsilon_b$ and $\epsilon_f$. To this end, we define $\epsilon_b'$ and $\epsilon_f'$ according to:

$$\epsilon_b'(\vec{D}_b, \vec{X}, n) = \tag{9}$$

$$\left(\sum_{\vec{x}\in B_1(\vec{X})} (F(\vec{x}-\alpha D_b, n-1) - F(\vec{x}+(1-\alpha)\vec{D}_b, n))^4\right) / N_{B1}$$

and $$\epsilon_f'(\vec{D}_f, \vec{X}, n) = \tag{10}$$

$$\left(\sum_{\vec{x}\in B_1(\vec{X})} (F(\vec{x}-\alpha D_f, n-1) - F(\vec{x}+(1-\alpha)\vec{D}_f, n))^4\right) / N_{B1}$$

where $N_{B1}$ stands for the number of samples in block $B_1(\vec{X})$. Instead of a fourth power, a second power can also be used.

The block $B_1(\vec{X})$ is not necessarily identical to $B(\vec{X})$. A smaller block size will mostly be preferred, as this allows a more detailed region categorization. This error measure has been chosen since it has proven to be the most effective, in most cases.

While we are within region I, it is concluded if $\epsilon_b' \leq Th$, that we are in region Ib, and in region Ia otherwise. The variable Th, here, is an experimentally determined, small, threshold value. In words: we assume to be in region Ib when $\vec{D}_b$ can be considered valid. This occurs when, at the temporal position of the image to be interpolated, the two luminance values obtained according to $\vec{D}_b$, i.e., the one from the delayed field and the one from the current field, can be matched with a small error. We assume to be in region Ia when $\vec{D}_b$ cannot be considered valid.

Similarly, while we are within region III, we conclude that if $\epsilon_f' \leq Th$, that we are in region IIIa, and in region IIIb otherwise. In words: we assume to be in region IIIa when $\vec{D}_f$ can be considered valid. This occurs when, at the temporal position of the image to be interpolated, the luminance values obtained according to $\vec{D}_f$ can be matched with a small error. We assume to be in region IIIb when $\vec{D}_f$ cannot be considered valid.

It can be concluded that for any image to be interpolated between the previous and the current field, it seems best to interpolate the result from the previous field only, or mainly, in case of 'real covering' of the background (region IIIb), whereas, in case of 'real uncovering' of the background (region Ia), the motion compensated data from the next field is preferred in the interpolation process. In all other cases, the motion compensated interpolator can use the data from both fields.

So, where a prior art motion compensated average would yield an intermediate picture according to:

$$F_i(\vec{x}, n) = \tfrac{1}{2}(F(\vec{x}-\alpha\vec{D}(\vec{x}, n), n-1) + F(\vec{x}+(1-\alpha)\vec{D}(\vec{x}, n), n)) \tag{11}$$

where $\alpha$ determines the temporal position of the interpolated image, we now propose to use different interpolation strategies for the various regions recognized according to the previous section. For example:

$$F_i(\vec{x}, n) = \begin{cases} F(\vec{x}-\alpha\vec{D}_?(\vec{x}, n), n-1), & \text{region III}_b \\ F(\vec{x}+(1-\alpha)\vec{D}_?(\vec{x}, n), n), & \text{region I}_a \\ \tfrac{1}{2}(F(\vec{x}-\alpha\vec{D}_f(\vec{x}, n), n-1) + F(\vec{x}+(1-\alpha)\vec{D}_f(\vec{x}, n), n)), & \text{region III}_a \\ \tfrac{1}{2}(F(\vec{x}-\alpha\vec{D}_b(\vec{x}, n), n-1) + F(\vec{x}+(1-\alpha)\vec{D}_b(\vec{x}, n), n)), & \text{region I}_b \\ \tfrac{1}{2}(F(\vec{x}-\alpha\vec{D}_f(\vec{x}, n), n-1) + F(\vec{x}+(1-\alpha)\vec{D}_b(\vec{x}, n), n)), & \text{otherwise} \end{cases} \tag{12}$$

Rather then switching between the various interpolation methods in (12), a soft switch could be thought of, i.e., a fading between the five alternatives. We will, however, not further elaborate this thought here.

In Eq. (12), and also in FIG. 2, vectors $\vec{D}_?$ occur, which, up to now, have no meaning. They are required for those parts of the interpolated image where there is either covering or uncovering. Therefore, it is known that either the previous or the next image should be solely used in the interpolation, but no valid vector is available to shift the corresponding background that either appears or disappears.

In order to solve this problem, we here propose to search for the nearest vector describing the background velocity. If we are in the uncovering region I, this nearest vector is obtained from the backward predicting motion estimator, generating $\vec{D}_b$, at a location shifted over the negative value of the forward predicting motion vector $\vec{D}_f$, multiplied by $\alpha$, the temporal position of the image to be interpolated. If we are in the covering region III, this nearest vector is obtained from the forward predicting motion estimator, generating $\vec{D}_f$, at a location shifted over the negative value of the backward predicting motion vector $\vec{D}_b$, multiplied by $(1-\alpha)$. So, more formally:

$$\vec{D}_?(\vec{x}, n) = \begin{cases} \vec{D}_f(\vec{x} - \alpha\vec{D}_b, n), & \text{(region I}_a\text{, i.e. 'real uncovering')} \\ \vec{D}_b(\vec{x} + (1-\alpha)\vec{D}_f, n), & \text{(region III}_b\text{, i.e. 'real covering')} \end{cases} \quad (13)$$

An alternative, prior art, motion compensated interpolation was described in Ref. 1. It uses an order statistical filter to make the upconversion more robust with regard to erroneous motion vectors. A very basic version was described in Ref. 6, and applied in the Natural Motion IC Ref. 9. This version uses:

$$F_i(\vec{x}, n) = med\big(F(\vec{x} - \alpha\vec{D}(\vec{x}, n), n-1), Av, F(\vec{x} + (1-\alpha)\vec{D}(\vec{x}, n), n)\big) \quad (14)$$

with $$Av = \frac{1}{2}(F(\vec{x}, n) + F(\vec{x}, n-1)) \quad (15)$$

and $$med(a, b, c) = \begin{cases} a, & (b \leq a \leq c \ V \ c \leq a \leq b) \\ b, & (a \leq b \leq c \ V \ c \leq b \leq a) \\ c, & \text{otherwise} \end{cases} \quad (16)$$

In regions Ib and IIIa, a safer version of the interpolation according to the current invention would use a similar approach. As can be seen from the equations (18) below, motion compensated weighted averaging is proposed for 'uncomplicated' areas. In region Ib and IIIa, i.e., the areas in which there is no actual covering in the image to be interpolated, but yet near a complicated region, the robust interpolation according to Eq. (14) is proposed.

In the 'real' covering and uncovering areas, Ia and IIIb, we would like, as well, to propose a robust interpolation method. Thus, we again make use of a median filter. As an input to the median filter, our best guess is the pixel from the previous/current frame (depending on covering/uncovering), shifted over $D_?$. Another useful 'candidate pixel' is the pixel selected when shifting over the vector that would be valid for the neighboring a/b area (Ia, in case we are in the uncovering region, IIIb otherwise). The third pixel that we propose here is the one from the same field shifted over $D_{??}$, where:

$$\vec{D}_{??}(\vec{x}, n) = \begin{cases} \vec{D}_f(\vec{x} - \vec{D}_b, n), & \text{(region I}_a\text{, i.e. 'real uncovering')} \\ \vec{D}_b(\vec{x} + \vec{D}_f, n), & \text{(region III}_b\text{, i.e. 'real covering')} \end{cases} \quad (17)$$

or preferably, $$\vec{D}_{??}(\vec{x}, n) = \begin{cases} \vec{D}_f\left(\vec{x} - \left(\alpha + \frac{2}{3}\alpha\right)\vec{D}_b, n\right), & \text{(region I}_a\text{, i.e. 'real uncovering')} \\ \vec{D}_b\left(\vec{x} + \left((1-\alpha) + \frac{2}{3}\alpha\right)\vec{D}_f, n\right), & \text{(region III}_b\text{, i.e. 'real covering')} \end{cases} \quad (17a)$$

The thought behind this choice is that $D_?=D_{??}$ in most cases where $D_?$ is reliable. In those cases, therefore, our best guess is actually selected as the output pixel. If $D_?$ and $D_{??}$ are not identical, it is likely that confusion exists between region a and b, and the chance increases that the second 'candidate pixel' is chosen. Eventually, the sequence would be processed according to:

$$F_i(\vec{x}, n) = \begin{cases} med\big(F(\vec{x} - \alpha\vec{D}_?(\vec{x}, n), n-1), F_{III_a}, F(\vec{x} - \alpha\vec{D}_{??}(\vec{x}, n), n-1)\big), & \text{region III}_b \\ med\big(F(\vec{x} + (1-\alpha)\vec{D}_?(\vec{x}, n), n), F_{I_b}, F(\vec{x} + (1-\alpha)\vec{D}_{??}(\vec{x}, n), n)\big), & \text{region I}_a \\ med\big(F(\vec{x} - \alpha\vec{D}_f(\vec{x}, n), n-1), Av, F(\vec{x} + (1-\alpha)\vec{D}_f(\vec{x}, n), n)\big), & \text{region III}_a \\ med\big(F(\vec{x} - \alpha\vec{D}_b(\vec{x}, n), n-1), Av, F(\vec{x} + (1-\alpha)\vec{D}_b(\vec{x}, n), n)\big), & \text{region I}_b \\ \frac{1}{2}\big(F(\vec{x} - \alpha\vec{D}_f(\vec{x}, n), n-1) + F(\vec{x} + (1-\alpha)\vec{D}_b(\vec{x}, n), n)\big), & \text{otherwise} \end{cases} \quad (18)$$

where:

$$F_{IIIa} = \frac{1}{2}\left(F(\vec{x} - \alpha \vec{D}_f(\vec{x}, n), n-1) + F(\vec{x} + (1-\alpha)\vec{D}_f(\vec{x}, n), n)\right) \quad (19)$$

and $$F_{Ib} = \frac{1}{2}\left(F(\vec{x} - \alpha \vec{D}_b(\vec{x}, n), n-1) + F(\vec{x} + (1-\alpha)\vec{D}_b(\vec{x}, n), n)\right) \quad (20)$$

In order to provide a safer interpolation strategy for the most critical regions (Ia and IIIb), an another solution has been tested.

For region $I_a$:

$$F_i(\vec{x}, n) = med_5 \ (F(\vec{x} + (1-\alpha)\vec{D}_?(\vec{x}, n), n), \quad (18a)$$
$$F(\vec{x} + (1-\alpha)\vec{D}_{??}(\vec{x}, n), n), Av,$$
$$F(\vec{x} - \alpha \vec{D}_b(\vec{x}, n), n-1),$$
$$F(\vec{x} + (1-\alpha)\vec{D}_b(\vec{x}, n), n))$$

and for region $III_b$:

$$F_i(\vec{x}, n) = med_5 \ (F(\vec{x} + -\alpha \vec{D}_?(\vec{x}, n), n-1), \quad (18b)$$
$$F(\vec{x} - \alpha \vec{D}_{??}(\vec{x}, n), n-1), Av,$$
$$F(\vec{x} - \alpha \vec{D}_f(\vec{x}, n), n-1),$$
$$F(\vec{x} + (1-\alpha)\vec{D}_f(\vec{x}, n), n))$$

Figure 3:
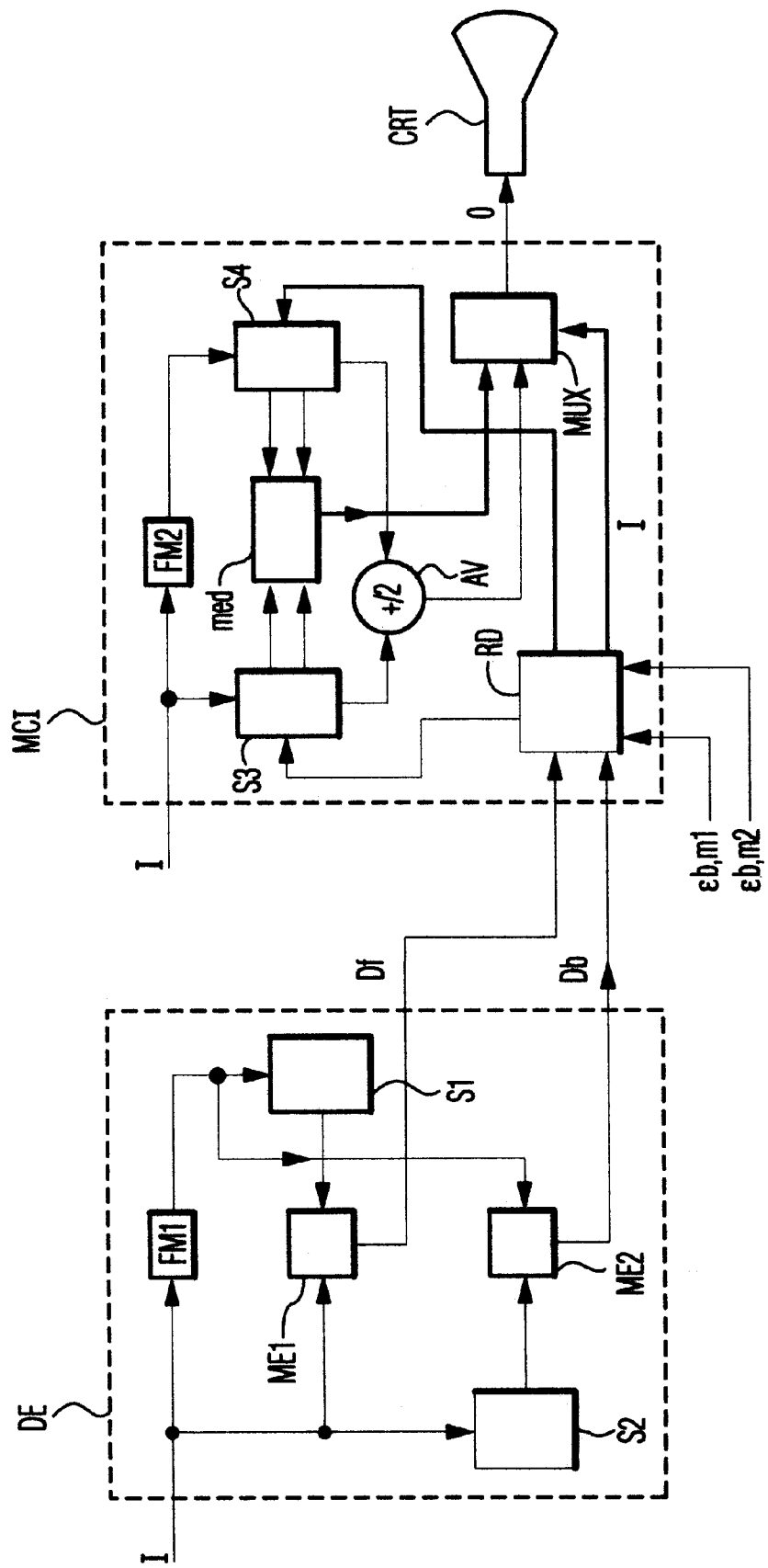
FIG. 3 shows a preferred embodiment of the current invention.

This sophistication experimentally proved to significantly increase the interpolation quality. A preferred embodiment of the current invention is shown in the block diagram of FIG. 3. An input video signal I is applied to a dual estimator DE having two motion vector estimators ME1, ME2. In the dual estimator DE, the input video signal I is applied to a field delay FM1, a first input of the first motion vector estimator ME1, and to a first input of the second motion vector estimator ME2 thru a shifter S2. An output signal of the field delay FM1 is applied to a second input of the second motion estimator ME2, and to a second input of the first motion vector estimator ME1 thru a shifter S1. The first motion vector estimator ME1 supplies the vector Df, while the second motion vector estimator ME2 supplies the vector Db.

The input video signal I is also applied to a motion-compensated interpolator MCI. In the motion-compensated interpolator MCI, the input video signal I is applied to a field delay FM2, and to a shifter S3. An output of the field delay FM2 is applied to a shifter S4. The shifters S3, S4 are controlled by the motion vectors Db, Df received from the dual estimator DE. Outputs of the shifters S3, S4 are applied to a median circuit med and to an average circuit Av. Outputs of the median circuit med and the average circuit Av are applied to a multiplexer MUX which supplies the output signal O to a display device CRT for displaying the output signal at, for example, a 100 Hz field rate. The motion vectors Db, Df, their errors εb, εf, and threshold values m1, m2 are applied to a region detector RD which furnishes a control signal to the multiplexer MUX.

A primary aspect of the invention can be summarized as follows. In pictures resulting from motion compensated field rate convertors, an artifact is visible at the boundary of moving objects where either covering or uncovering of backgrounds occurs. It is the object of the present invention to eliminate this local artifact. To this end, areas where covering and uncovering occur are recognized based on the relative prediction quality of two motion vectors. The two motion vectors are estimated between the same field pair, but differ in that the first is calculated to optimally predict the previous field from the next, whereas the second tries to predict the next field from the previous. An upconversion method using the two motion vectors is also described in this disclosure.

In a preferred interpolation method, two motion vectors, one predicting the next image from the previous image and the other predicting the previous image from the next, are taken from both sides of a discontinuity in the vector field, and both applied to predict the next image from the previous and to predict the previous image from the next, and a choice between the vectors is made in dependence on the relative suitability for the tested prediction.

A preferred embodiment can be summarized as follows. An image between neighboring images in a sequence, is interpolated by applying two motion vectors $\vec{V}_b$ and $\vec{V}_f$, one optimally suited for backwards predicting and the other for forwards prediction. The embodiment comprises:

means to shift data from the next image over a fraction of $\vec{V}_b$, means to shift data from the previous image over a complementary fraction of $\vec{V}_f$, means to shift data from the previous image over a fraction of $\vec{V}_f$, means to shift data from the next image over a fraction of $\vec{V}_b$, means to combine the shifted data, and possibly other (unshifted) data in dependence on segmentation information indicating covering/uncovering in the interpolated image, in order to form the interpolated image characterized in that in case of covering/uncovering, at least one of the vectors that are used in the combination process are taken from a spatial position that differs from the spatial position for which it was calculated. Preferably, the position from which the vector is taken, is shifted in the opposite direction in which the vector is pointing with regard to the position for which it was calculated.

Advantageously, in case of covering at least $\alpha \vec{V}_f$ is used shifted over $-\alpha \vec{V}_b$, while in case of uncovering at least $\alpha \vec{V}_b$ is used shifted over $-\alpha \vec{V}_f$.

It should be noted that the above-mentioned embodiments illustrate rather than limit the invention, and that those skilled in the art will be able to design many alternative embodiments without departing from the scope of the appended claims. The invention can be implemented by means of hardware comprising several distinct elements, and by means of a suitably programmed computer. In a device claim reciting a plurality of different means, several of these means may be embodied by a one and the same item of hardware. In an alternative embodiment, the covered and uncovered parts are not detected by comparing backward and forward estimation errors, but by analyzing direction and magnitude of motion vectors around contours.

References

[1] G. de Haan, P. W. A. C Biezen, H. Huijgen, and O. A. Ojo, "Motion compensated picture interpolation apparatus", U.S. Pat. No. 5,534,946, corresponding to European Patent Application no: 92201388.3 (PHN14.066), priority date: May 15, 1992.

[2] A. M. Tekalp, "Digital Video Processing", Prentice Hall Signal Processing Series, ISBN 0-13190075-7, pp. 200–203.

[3] A. M. Tekalp, "Digital Video Processing", Prentice Hall Signal Processing Series, ISBN 0-13190075-7, pp. 206–207.

[4] G. de Haan, P. W. A. C Biezen, "Motion compensated interpolation", U.S. Pat. No. 5,777,682, corresponding to European Patent Application no: 95200604 (PHN 15.216), priority date: Mar. 14, 1995.

[5] G. de Haan and G. F. M. De Poortere, "Motion compensated frame rate conversion", European Patent Application no: EP 0 475 499 A1, priority date: Sep. 3, 1990.

[6] G. de Haan, P. W. A. C Biezen, H. Huijgen, and O. A. Ojo, "Graceful Degradation in Motion Compensated Field-Rate Conversion", in: Signal Processing of HDTV, V, L. Stenger, L. Chiariglione and M. Akgun (Eds.), Elsevier 1994, pp. 249–256.

[7] G. de Haan, P. W. A. C. Biezen, H. Huijgen and O. A. Ojo, "True Motion Estimation with 3D Recursive Search Block-Matching", IEEE Transactions on Circuits and Systems for Video Technology, Vol.3, October 1993, pp. 368–388.

[8] G. de Haan, P. W. A. C Biezen, "Sub-pixel motion estimation with 3-D recursive search blockmatching", Signal Processing: Image Communication 6 (1994), pp. 229–239.

[9] G. de Haan, J. Kettenis, and B. Deloore, "IC for Motion Compensated 100 Hz TV, with a Smooth Motion Movie-Mode". International Conference on Consumer Electronics, ICCE'95, June 1995, Chicago.

[10] H. Sonehara, Y. Nojiri, K. Iguchi, Y. Sugiura, and H. Hirabayashi, "Motion estimation method using the spatiio-temporal characteristic of moving objects", Proc. of HDTV'96, Los Angeles, October 1996.

What is claimed is:

1. A method of detecting covered and uncovered parts in an image to be interpolated at a temporal location between neighboring previous and next input images, the method comprising the steps:

detecting motion from said next input image to said previous input image, resulting in backward motion vectors having corresponding backward estimation errors;

detecting motion from said previous input image to said next input image, resulting in forward motion vectors having corresponding forward estimation errors; and detecting uncovered and covered parts in said neighboring previous and next input images, respectively; characterized in that said method further comprises the steps:

detecting, in said detected uncovered parts, further uncovered parts in said image to be interpolated by determining second backward estimation errors by comparing both neighboring previous and next input images when partially shifted over said backward motion vectors to said temporal location of said image to be interpolated, and by comparing said second backward estimation errors to a threshold; and detecting, in said thus detected covered parts, further covered parts in said image to be interpolated by determining second forward estimation errors by comparing both neighboring previous and next input images when partially shifted over said forward motion vectors to a temporal location of said image to be interpolated, and by comparing said second forward estimation errors to said threshold.

2. The method as claimed in claim 1, wherein said step of detecting said uncovered and said covered parts in said neighboring previous and next input images includes the step:

processing said backward estimation errors and said forward estimation errors to detect said uncovered and said covered parts in said neighboring previous and next input images, respectively.

3. A device for detecting covered and uncovered parts in an image to be interpolated at a temporal location between neighboring previous and next input images, the device comprising:

first means for detecting motion from said next input image to said previous input image, said first detecting means forming backward motion vectors having corresponding backward estimation errors;

second means for detecting motion from said previous input image to said next input image, said second detecting means forming forward motion vectors having corresponding forward estimation errors;

third means for detecting uncovered and covered parts in said neighboring previous and next input images, respectively;

fourth means for detecting, in said detected uncovered parts, further uncovered parts in said image to be interpolated by determining second backward estimation errors by comparing both neighboring previous and next input images when partially shifted over said backward motion vectors to said temporal location of said image to be interpolated, and by comparing said second backward estimation errors to a threshold; and fifth means for detecting, in said detected covered parts, further covered parts in said image to be interpolated by determining second forward estimation errors by comparing both neighboring previous and next input images when partially shifted over said forward motion vectors to a temporal location of said image to be interpolated, and by comparing said second forward estimation errors to said threshold.

4. A device for estimating motion vectors, comprising:

a device for detecting covered and uncovered parts in an image to be interpolated as claimed in claim 3; and means for furnishing motion vectors for said covered and uncovered parts in said image to be interpolated in dependence upon said backward motion vectors and said forward motion vectors.

5. A method of estimating motion vectors for an image to be interpolated at a temporal location between neighboring previous and next input images, the method comprising the steps:

detecting motion from said next input image to said previous input image, resulting in backward motion vectors having corresponding backward estimation errors;

detecting motion from said previous input image to said next input image, resulting in forward motion vectors having corresponding forward estimation errors;

detecting uncovered and covered parts in said image to be interpolated;

furnishing motion vectors for said uncovered parts in dependence upon said forward motion vectors taken from temporal locations wholly and/or partly shifted over said backward motion vector; and furnishing motion vectors for said covered parts in dependence upon said backward motion vectors taken from temporal locations wholly and/or partly shifted over said forward motion vectors.

6. The method as claimed in claim 5, wherein said step of detecting said uncovered and said covered parts in said image to be interpolated includes the step:

processing said backward estimation errors and said forward estimation errors to detect said uncovered and said covered parts in said image to be interpolated.

7. The method as claimed in claim 5, wherein said steps of furnishing motion vectors for said uncovered and covered parts comprises the steps:

furnishing first motion vectors for said uncovered parts by taking said forward motion vectors from temporal locations wholly shifted over said backward motion vectors;

furnishing second motion vectors for said uncovered parts by taking said forward motion vectors from temporal locations partly shifted over said backward motion vectors corresponding to said temporal location of said image to be interpolated between said neighboring previous and next images;

furnishing first motion vectors for said covered parts by taking said backward motion vectors from temporal locations wholly shifted over said forward motion vectors; and furnishing second motion vectors for said covered parts by taking said backward motion vectors from temporal locations partly shifted over said forward motion vectors corresponding to said temporal location of said image to be interpolated between said neighboring previous and next images.

8. A method of interpolating an image at a temporal location between neighboring previous and next input images, the method comprising the steps:

estimating motion vectors for said image to be interpolated in accordance with the method of claim 5; and furnishing said image to be interpolated by said backward motion vectors, said forward motion vectors, said motion vectors for said uncovered parts, and said motion vectors for said covered parts.

9. A device for estimating motion vectors for an image to be interpolated at a temporal location between neighboring previous and next input images, the device comprising:

first means for detecting motion from said next input image to said previous input image, said first detecting means forming backward motion vectors having corresponding backward estimation errors;

second means for detecting motion from said previous image to said next image, said second detecting means forming forward motion vectors having corresponding forward estimation errors;

third means for detecting uncovered and covered parts in said image to be interpolated;

means for furnishing motion vectors for said uncovered parts in dependence upon said forward motion vectors taken from temporal locations wholly and/or partly shifted over said backward motion vector; and means for furnishing motion vectors for said covered parts in dependence upon said backward motion vectors taken from temporal locations wholly and/or partly shifted over said forward motion vector.

10. A display apparatus, comprising:

a device for estimating motion vectors for an image to be interpolated between neighboring previous and next input images, as claimed in claim 9;

means for interpolating said image between said neighboring previous and next input images by said backward motion vectors, said forward motion vectors, said motion vectors for said uncovered parts, and said motion vectors for said covered parts; and means for displaying an image sequence formed by said neighboring previous and next input images and said image.

\* \* \* \* \*